US009832230B2

(12) United States Patent
Kato et al.

(10) Patent No.: US 9,832,230 B2
(45) Date of Patent: *Nov. 28, 2017

(54) IC CHIP, INFORMATION PROCESSING APPARATUS, SYSTEM, METHOD, AND PROGRAM

(71) Applicant: FeliCa Networks, Inc., Tokyo (JP)

(72) Inventors: Shinichi Kato, Kanagawa (JP); Naofumi Hanaki, Kanagawa (JP); Shuichi Sekiya, Saitama (JP); Itsuki Kamino, Kanagawa (JP)

(73) Assignee: Felica Networks, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/067,669

(22) Filed: Mar. 11, 2016

(65) Prior Publication Data

US 2016/0197960 A1    Jul. 7, 2016

Related U.S. Application Data

(63) Continuation of application No. 14/567,453, filed on Dec. 11, 2014, now Pat. No. 9,319,403, which is a (Continued)

(30) Foreign Application Priority Data

Oct. 16, 2009   (JP) ................ 2009-239257

(51) Int. Cl.
H04L 29/06     (2006.01)
G06F 21/77     (2013.01)
(Continued)

(52) U.S. Cl.
CPC ............. *H04L 63/20* (2013.01); *G06F 21/30* (2013.01); *G06F 21/77* (2013.01); *G06Q 20/02* (2013.01);
(Continued)

(58) Field of Classification Search
CPC . G06F 21/00; G06F 1/00; G06F 9/445; G06F 9/50; G06F 9/46; G06F 15/16;
(Continued)

(56) References Cited

U.S. PATENT DOCUMENTS 5,774,668 A  *  6/1998  Choquier ............... G06F 9/505
                                                        370/480
6,766,454 B1   7/2004 Riggins
(Continued)

FOREIGN PATENT DOCUMENTS

CN       101251878      8/2008
CN       101324912      12/2008
(Continued)

OTHER PUBLICATIONS

European Search Report dated Feb. 21, 2011, corresponding to European Appln. No. 10186890.9.

Primary Examiner — Thanhnga B Truong
(74) Attorney, Agent, or Firm — K&L Gates LLP

(57) ABSTRACT

An IC chip, an information processing apparatus, system, method, and program are provided. An IC chip includes an authentication control unit configured to authenticate a request using authentication information. The request and/or the authentication information is received from outside the IC chip.

15 Claims, 13 Drawing Sheets

Related U.S. Application Data continuation of application No. 13/889,048, filed on May 7, 2013, now Pat. No. 9,077,712, which is a continuation of application No. 12/899,686, filed on Oct. 7, 2010, now Pat. No. 8,516,565.

(51) Int. Cl.

| | | |
|---|---|---|
| *G06Q 20/02* | (2012.01) | |
| *G06Q 20/32* | (2012.01) | |
| *G06Q 20/34* | (2012.01) | |
| *G07F 7/08* | (2006.01) | |
| *G06F 21/30* | (2013.01) | |
| *H04L 29/08* | (2006.01) | |

(52) U.S. Cl.
CPC ......... *G06Q 20/32* (2013.01); *G06Q 20/3227* (2013.01); *G06Q 20/3552* (2013.01); *G06Q 20/3576* (2013.01); *G06Q 20/35765* (2013.01); *G07F 7/0866* (2013.01); *H04L 63/0853* (2013.01); *H04L 63/126* (2013.01); *H04L 67/1002* (2013.01); *H04L 2463/102* (2013.01)

(58) Field of Classification Search
CPC .............. G06F 21/6218; G06Q 20/341; G06Q 20/357; G06Q 30/06; G07F 7/1008; H04L 9/32; H04L 63/083; H04L 9/3242; H04L 63/08; H04L 9/0861; H04L 9/0841; H04L 63/107; H04L 9/3271; H04L 63/061; H04L 63/0869

USPC .......... 726/1–3, 34; 709/203, 218, 223, 227, 709/249, 159, 219; 713/320, 159, 219; 710/5; 370/480; 717/177; 718/105

See application file for complete search history.

(56) References Cited

U.S. PATENT DOCUMENTS

| | | | |
|---|---|---|---|
| 6,990,588 | B1 | 1/2006 | Yasukura |
| 7,707,225 | B2* | 4/2010 | Akashika ............. G06Q 20/327 |
| | | | 380/277 |
| 8,370,959 | B2* | 2/2013 | Gunadisastra .......... G06F 21/34 |
| | | | 713/320 |
| 8,447,838 | B2* | 5/2013 | Matsumura ......... G06F 21/6218 |
| | | | 709/219 |
| 2003/0033539 | A1 | 2/2003 | Cheng |
| 2007/0118558 | A1 | 5/2007 | Kahandaliyanage |
| 2007/0177769 | A1 | 8/2007 | Motoyama et al. |
| 2008/0263630 | A1 | 10/2008 | Harada et al. |
| 2010/0235629 | A1* | 9/2010 | Tuda ................... G06Q 20/341 |
| | | | 713/159 |

FOREIGN PATENT DOCUMENTS

| | | |
|---|---|---|
| CN | 101512540 | 8/2009 |
| EP | 1085424 | 3/2001 |
| EP | 1367843 | 12/2003 |
| EP | 1764721 | 3/2007 |
| JP | 2001-56848 | 2/2001 |
| JP | 2002-279390 | 9/2002 |
| JP | 2003-317070 | 11/2003 |
| JP | 2005-56292 | 3/2005 |
| WO | 2009/013700 | 1/2009 |
| WO | 2009/070752 | 6/2009 |

\* cited by examiner

FIG.5

| ITEM NUMBER | ITEM NAME | EXPLANATION |
|---|---|---|
| 1 | HASH VALUE | HASH VALUE GENERATED FROM PIN VALUE AND DATA OF ITEMS 2, 3, 4 |
| 2 | EXECUTABLE COMMAND | LIST OF COMMANDS OF SECURE CHIP EXECUTED BY APPLICATION |
| 3 | ACCESS REGION | REGION IN SECURE CHIP USED BY APPLICATION |
| 4 | ISSUER IDENTIFICATION CODE | INFORMATION FOR IDENTIFYING ISSUER OF SECURE CHIP |

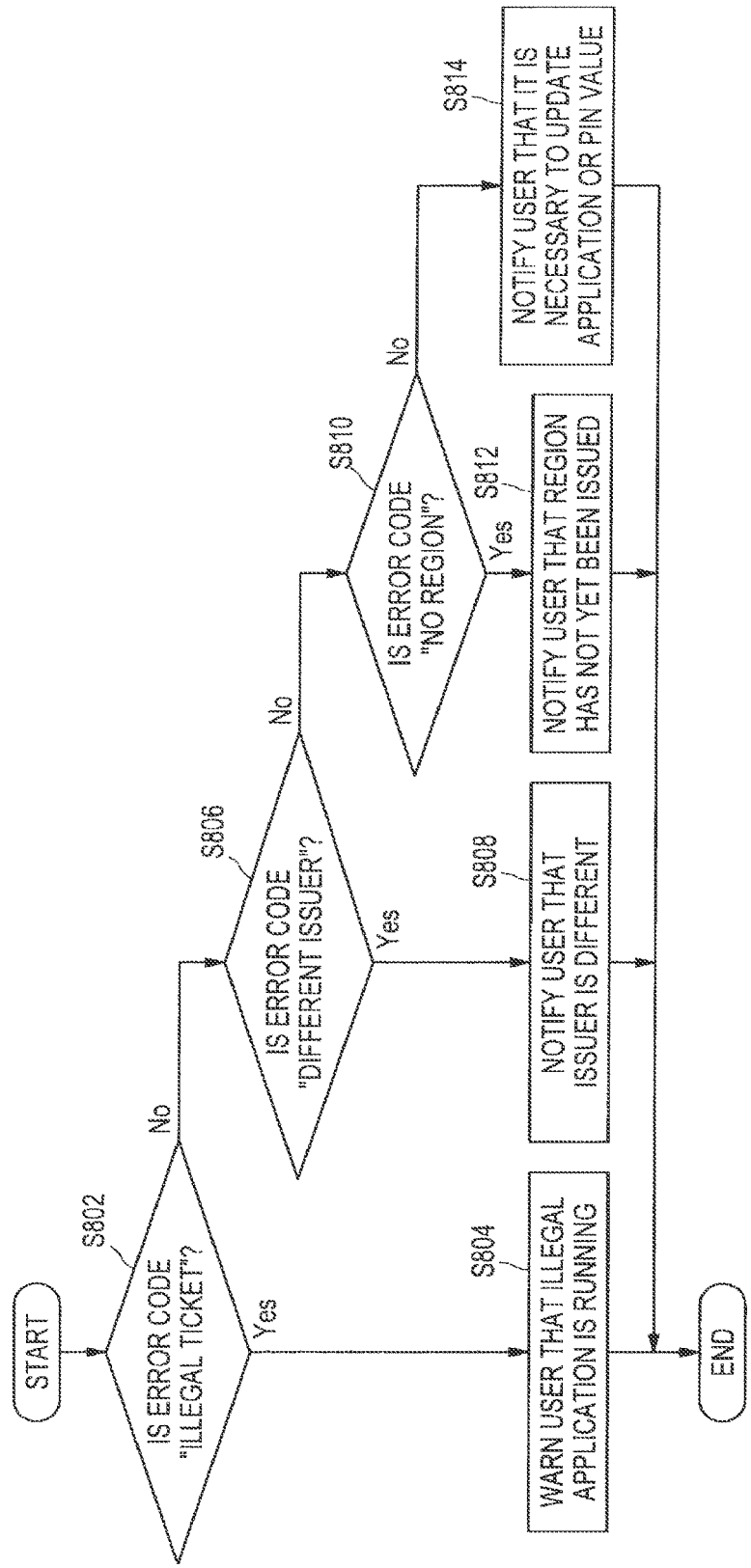

IC CHIP, INFORMATION PROCESSING APPARATUS, SYSTEM, METHOD, AND PROGRAM

CROSS REFERENCES TO RELATED APPLICATIONS

The present application is a continuation application of, and claims the benefit of and priority to, U.S. patent application Ser. No. 14/567,453, filed Dec. 11, 2014, which is a continuation of U.S. patent application Ser. No. 13/889,048, filed on May 7, 2013, now U.S. Pat. No. 9,077,712, issued Jul. 7, 2015, which is a continuation of U.S. patent application Ser. No. 12/899,686, filed on Oct. 7, 2010, now U.S. Pat. No. 8,516,565 issued Aug. 20, 2013, which claims priority to Japanese Priority Patent Application JP 2009-239257 filed in the Japan Patent Office on Oct. 16, 2009, the entire content of each of which is hereby incorporated by reference herein.

BACKGROUND

The present application relates to an IC chip, an information processing apparatus, system, method, and program.

In recent years, information processing apparatuses such as a portable telephone including an IC chip having tamper resistant properties (hereinafter referred to as "secure chip") have come into widespread use. A user can communicate data by simply passing such information processing apparatus over a reader/writer, for example. Accordingly, the information processing apparatus is extremely convenient. For example, when this information processing apparatus is applied to an electronic money system, the user can immediately make payment at a store and the like by simply passing the information processing apparatus over the reader/writer.

Information stored in a nonvolatile memory of a secure chip is protected by means of encryption. Therefore, it is difficult to tamper with the information. However, if any application is allowed to freely use the secure chip in the information processing apparatus, there is a possibility that the application may use the security chip without the user being aware of it and the application may execute a command for temporarily halting the use of the security chip on its own, which cause issues in terms of security.

In order to overcome the issue, an information processing apparatus having an ordinary secure chip usually has a mechanism for preventing an application from directly operating the secure chip when the application uses the secure chip. More specifically, when the application operates the secure chip, the mechanism forces the application to operate the secure chip by way of a predetermined secure chip control module at all times. The secure chip control module restricts commands of the secure chip that can be executed by the application, thus preventing abuse.

SUMMARY

However, in the above-described abuse prevention method, the platform of the information processing apparatus has to be implemented with the mechanism for preventing the application from directly operating the secure chip. On the other hand, when the mechanism is hacked, there is a possibility that the secure chip is used illegally by developing a method for working around the secure chip control module to directly operate the secure chip.

In light of the foregoing, it is desirable to provide a novel and improved IC chip, information processing apparatus, system, method, and program that can reliably prevent an application from making an illegal access to an IC chip.

In an example embodiment, an integrated circuit chip includes an authentication control unit configured to authenticate a request using authentication information, wherein at least one of the request and the authentication information is received from outside the integrated circuit chip.

In an example embodiment, the request includes at least one of an executable command, an access region, and an issuer identification code.

In an example embodiment, the authentication information includes a hash value.

In an example embodiment, an issue device of the integrated circuit chip generates at least one of the request and the authentication information.

In an example embodiment, the issue device issues the at least one of the request and the authentication information to an application generator.

In an example embodiment, the issue device registers information related to an access region of the request with an access region issuing server.

In an example embodiment, the issue device registers a PIN value related to an access region of the request with an access region issuing server.

In an example embodiment, the integrated circuit chip executes a command based on information about commands which an application is permitted to execute; and information about memory regions of the integrated circuit chip which the application is permitted to access.

In an example embodiment, a chip control module receives the request from an application, turns on the integrated circuit chip, issues an authentication command to the integrated circuit chip, and transmits the request to the integrated circuit chip.

In an example embodiment, the request is received at the integrated circuit chip, and in response to the request, the integrated circuit conducts an access to a memory location.

In an example embodiment, the request is authenticated to determine whether the request is legal, the request is determined to be legal, the request is accepted, the integrated circuit chip notifies the chip control module that the request has been accepted, and the chip control module notifies the application that the request has been authenticated.

In an example embodiment, the application calls a chip operation API for using the integrated circuit chip, the chip control module issues an executable command to the integrated circuit chip, the authentication control unit checks whether the executable command is permitted to be executed and whether the access region of the executable command is permitted to be accessed.

In an example embodiment, the integrated circuit chip executes the executable command, the integrated circuit chip notifies the chip control module of the result of the execution of the executable command, the chip control module notifies the application of the result of the execution of the executable command, the application requests the chip control module to terminate the use of the integrated circuit chip, and the chip control module turns off the integrated circuit chip.

In an example embodiment, the request and the authentication information are erased.

In an example embodiment, following the authentication of the request, information which is legally accessed by the request is displayed on a display unit.

In an example embodiment, an information processing apparatus includes an integrated circuit chip including an authentication control unit configured to authenticate a request using authentication information, wherein at least one of the request and the authentication information is received from outside the integrated circuit chip.

In an example embodiment, the information processing apparatus is a portable telephone.

In an example embodiment, an information processing system includes an information processing apparatus including an integrated circuit chip including an authentication control unit configured to authenticate a request using authentication information, wherein at least one of the request and the authentication information is received from outside the integrated circuit chip.

In an example embodiment, a method includes authenticating, by an integrated circuit chip including an authentication control unit, a request using authentication information, wherein at least one of the request and the authentication information is received from outside the integrated circuit chip.

In an example embodiment, a storage medium stores a program which, when executed, causes an integrated circuit chip including an authentication control unit to authenticate a request using authentication information, wherein at least one of the request and the authentication information is received from outside the integrated circuit chip.

According to the example embodiments described above, the application may be reliably prevented from making illegal access to the IC chip.

Additional features and advantages are described herein, and will be apparent from the following Detailed Description and the figures.

BRIEF DESCRIPTION OF THE FIGURES

FIG. 5 is an explanatory diagram for illustrating the configuration of the example chip access ticket in detail.

FIG. 13 is a flowchart illustrating an example processing performed according to error code that are executed by the client 100 of FIG. 3.

DETAILED DESCRIPTION

Figure 1:
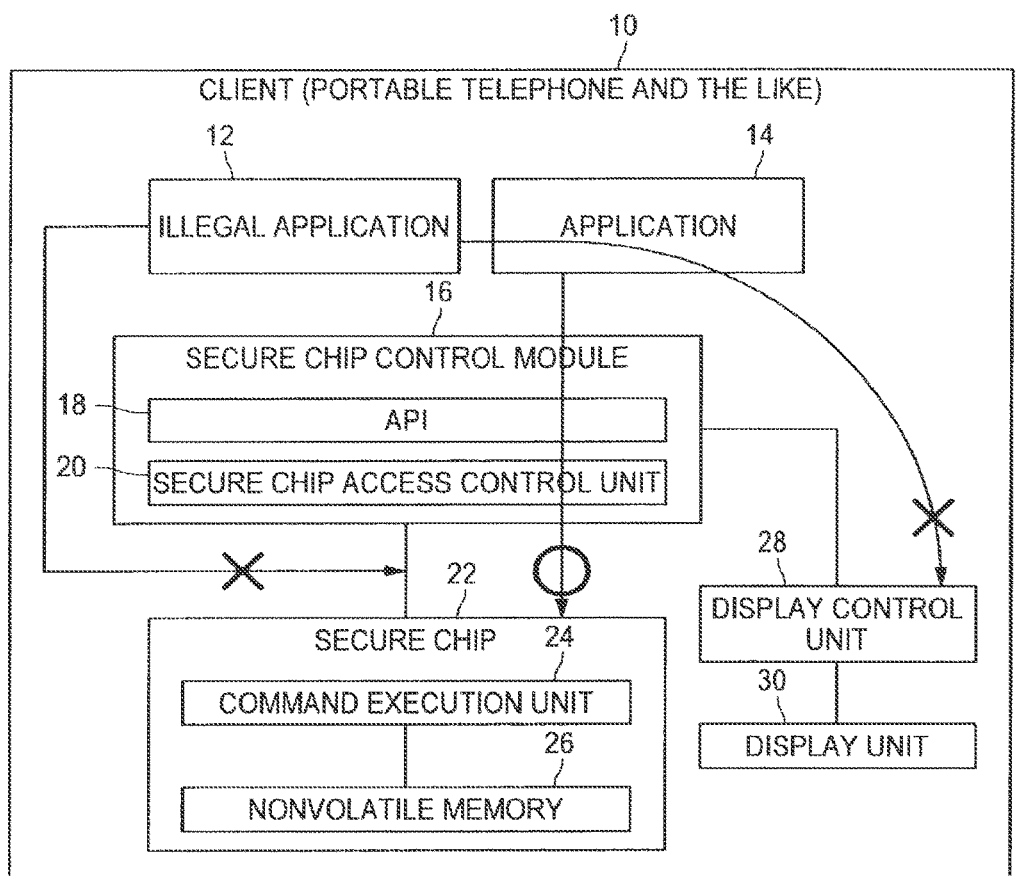
FIG. 1 is an explanatory diagram for illustrating an example of access control of an application to a secure chip in a related information processing apparatus.

Hereinafter, example embodiments will be described in detail with reference to the appended drawings. Note that, in this specification and the appended drawings, structural elements that have substantially the same function and structure are denoted with the same reference numerals, and repeated explanation of these structural elements is omitted.

The explanation will be made by way of examples in the following order.

1. Access control of related information processing apparatus
2. Configuration of information processing system
3. Configuration of information processing apparatus
4. Configuration of chip access ticket
5. First preparation processing for access control
6. Second preparation processing for access control
7. Access control processing
8. Chip access ticket authentication processing
9. Details of access control processing
10. PIN value change processing
11. Modification of chip access ticket authentication processing
12. Processings performed according to error codes

[1. Access Control of Related Information Processing Apparatus]

Before explaining the information processing system and the information processing apparatus according to an example embodiment, an access control of an application to a secure chip in a related information processing apparatus will be first described. FIG. 1 is an explanatory diagram for illustrating an example access control of the application to the secure chip in the related information processing apparatus.

In FIG. 1, a client 10 such as a portable telephone serving as the related information processing apparatus includes a secure chip control module 16, a secure chip 22, a display control unit 28, and a display unit 30 such as LED. An illegal application 12 and an application 14 are installed on the client 10.

The secure chip control module 16 includes an API (Application Program Interface) 18 and a secure chip access control unit 20. The secure chip 22 includes a command execution unit 24 and a nonvolatile memory 26.

For example, the client 10 permits the application 14 to use information stored in a region of the nonvolatile memory 26 of the secure chip 22, thus providing various services such as electronic money service to the user.

When, in the client 10, the application 14 requests the secure chip control module 16, by way of the API 18, to permit the application 14 to access the secure chip 22, the secure chip access control unit 20 controls access made by the application 14 to the secure chip 22. Since the application 14 is a legal application, the secure chip access control unit 20 permits the application 14 to access the secure chip 22 as shown by a circle in FIG. 1. The secure chip access control unit 20 can also restrict command that can be executed by the application 14.

When, in the client 10, the illegal application 12 requests the secure chip control module 16, by way of the API 18, to permit the illegal application 12 to access the secure chip 22, the secure chip access control unit 20 does not permit the illegal application 12 to access the secure chip 22. The legal application 14 and the illegal application 12 are distinguished by causing the secure chip access control unit 20 to verify the application signature attached to the application. Therefore, the illegal application 12 can be prevented from illegally accessing the secure chip 22. When the secure chip control module 16 accepts an access request from the illegal application 12 to the secure chip 22, the secure chip control module 16 controls the display control unit 28 and uses the display unit 30 to notify the user of the access situation. Therefore, the user can recognize the illegal access request made by the illegal application 12 to the secure chip 22.

In the above-described example access control, however, the platform of the client 10 has to have a mechanism for preventing the application from directly operating the secure chip 22. When the mechanism is hacked, the following methods may be developed: as shown by X on the left side of FIG. 1, the secure chip control module 16 may be worked around, and the secure chip 22 may be directly operated; and as shown by X on the right side of FIG. 1, the display control unit 28 may be illegally operated, and the function of the display control unit 28 is disabled. In such cases, there is a possibility that the secure chip 22 may be illegally used.

When only the commands are restricted, the application may scan the nonvolatile memory 26 to collect private information, e.g., what kind of services are used by the user, and there is an issue in that it is difficult to prevent the application from making such illegal access to the secure chip 22.

In order to solve the above issues, the secure chip 22 itself may have a mechanism for restricting the use. However, the techniques disclosed in Japanese Patent Application Laid-Open No. 2001-56848 and Japanese Patent Application Laid-Open No. 2005-56292 have an issue in that it is difficult to apply flexible access control to various applications executed one after another on the client.

In the techniques disclosed in Japanese Patent Application Laid-Open No. 2001-56848, access permission can be set for each command executed on the IC card. However, a command permission has to be set by inputting a password for rewriting the access permission of a command from the outside, and accordingly the platform side has to have the setting function. As a result, it is difficult for the secure chip itself to set different access permission for each of used applications, and the access permission of the command is maintained permanently on the secure chip. For this reason, in an environment where different applications are executed one after another on a terminal, there is an issue in that a permission of a previously-executed application may remain without being deleted, when, e.g., the terminal is accidentally shut down while the application is still running.

In the technique disclosed in Japanese Patent Application Laid-Open No. 2005-56292, a plurality of authentication means are arranged, and the user can be notified that the application on the terminal is trying to use the secure chip. Although the user can control whether to give access permission for each application, the user can only set whether to permit execution of all commands existing on the secure chip or completely prohibit execution of them all, and it is difficult for the user to set different access permission for each application. Moreover, the user has to make a decision on every occasion, and there is an issue in that the procedure of use is cumbersome.

Accordingly, the later-described information processing system according to the present embodiment executes a first preparation processing and a second preparation processing for the later-described access control. Then, the information processing apparatus according to the present embodiment executes the later-described access control processing. Therefore, the information processing apparatus can reliably prevent the application from making an illegal access to the IC chip.

[2. Configuration of Information Processing System]

Figure 2:
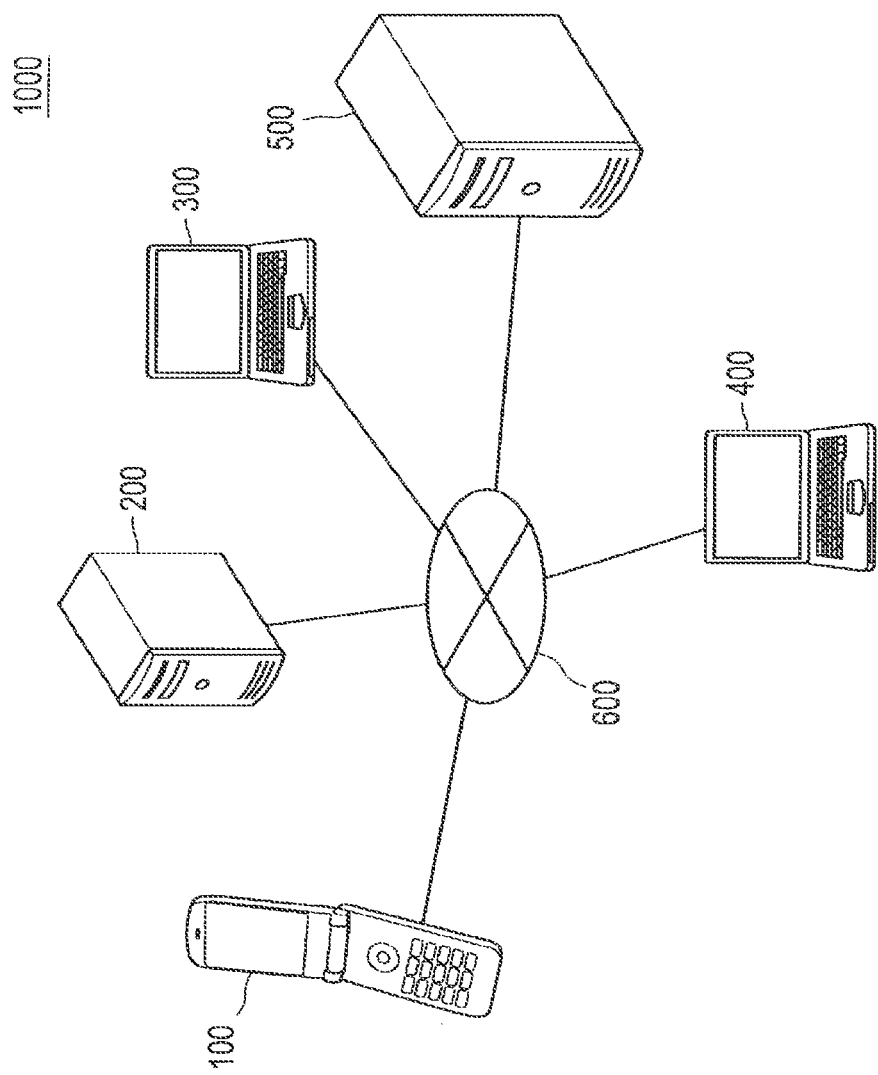
FIG. 2 is an explanatory diagram for illustrating an example schematic configuration of an information processing system according to an example embodiment.

Subsequently, the information processing system according to an example embodiment will be described. FIG. 2 is an explanatory diagram for illustrating a schematic configuration of the information processing system according to an example embodiment.

In FIG. 2, the information processing system 1000 includes the client 100 such as a portable telephone serving as an example of information processing apparatus, an application disclosure server 200, an application generator's PC 300, a secure chip issuer's PC 400, and an access region issuing server 500. The client 100, the servers 200, 500, the PCs 300, 400 are respectively connected to a communication network 600.

The client 100 can download applications disclosed by the application disclosure server 200. When the client 100 accepts a later-described access region issuing request from an installed application, the client 100 requests the access region issuing server 500 to perform online processing.

The application disclosure server 200 discloses the application generated on the application generator's PC 300. The application generator's PC 300 generates the application. When the application generator's PC 300 generates an application using a later-described secure chip 114, the application generator's PC 300 requests the secure chip issuer's PC 400 to permit use of the secure chip 114. When the secure chip issuer's PC 400 issues a later-described chip access ticket, the application generator's PC 300 embeds the issued chip access ticket into the generated application. Then, the application generator's PC 300 transmits the generated application to the application disclosure server 200.

After the secure chip issuer's PC 400 accepts from application generator's PC 300 the request for permitting the application generator's PC 300 to use the secure chip 114, the secure chip issuer's PC 400 generates a chip access ticket, and issues the generated chip access ticket to the application generator's PC 300. After the secure chip issuer's PC 400 generates the chip access ticket, the secure chip issuer's PC 400 registers information about an access region of the generated chip access ticket to the access region issuing server 500, and registers information about a PIN value, i.e., secret information, set for each access region of the generated chip access ticket to the access region issuing server 500.

For example, when the access region issuing server 500 accepts from the client 100 an online processing request for issuing an access region, the access region issuing server 500 issues an access region in a later-described nonvolatile memory 120 of the secure chip 114 of the client 100 through online processing, and registers the PIN value for each issued access region in the nonvolatile memory 120.

The information processing system 1000 executes the first preparation processing for later-described access control of FIG. 6 and the second preparation processing for access control of FIG. 7. Then, the client 100 can reliably prevent the application of the client 100 from making an illegal access to the secure chip by executing the later-described access control processing of FIG. 8.

In information processing system 1000 according to the present embodiment, both of the access region issuing server 500 and the secure chip 114 have a key and communicate with each other over encrypted online communication, thus ensuring security of important processing such as issuing of an access region. It should be noted that the programs in the client 100 do not have the key so that the key is not compromised.

However, for example, even when the client 100 is out of service area, the application has to be able to check the balance of electronic money. Accordingly, the secure chip 114 has non-encrypted regions and non-encrypted commands.

However, if the non-encrypted regions and commands are freely operated by the application, user lock may be canceled, and services may be scanned. In order to prevent this, a mechanism for restricting the use of the secure chip 114 has to be arranged aside from the encrypted communication.

This mechanism has been realized with an ordinary secure chip control module. However, in the present embodiment, this mechanism is realized with a more reliable method using the reliable chip access ticket.

[3. Configuration of Information Processing Apparatus]

Figure 3:
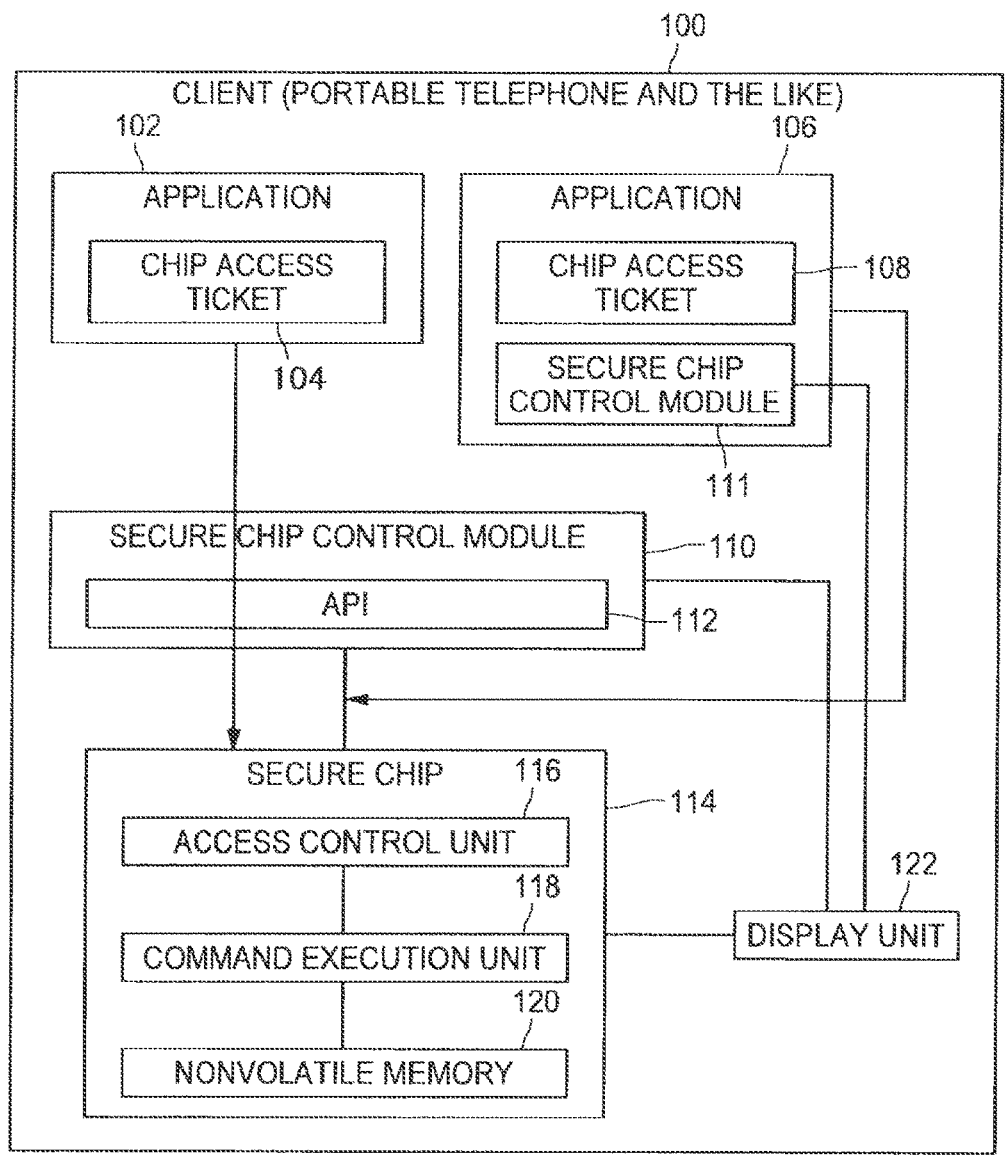
FIG. 3 is an explanatory diagram for illustrating an example schematic configuration of a client 100 serving as the information processing apparatus of FIG. 2.

Subsequently, the example client 100 serving as the information processing apparatus of FIG. 2 will be described. FIG. 3 is an explanatory diagram for illustrating an example schematic configuration of the client 100 serving as the information processing apparatus of FIG. 2.

In FIG. 3, the client 100 such as a portable telephone is an example of the information processing apparatus, and has a secure chip control module 110, the secure chip 114, and a display unit 122. In addition, the applications 102, 106 are installed on the client 100. In the present embodiment, the client 100 has the secure chip control module 110, but when the application installed on the client 100 such as the application 106 has the function of the secure chip control module 110, the client 100 may not have the secure chip control module 110.

The chip access ticket 104 is embedded in the application 102, and the chip access ticket 108 is embedded in the application 106. The application 106 has the secure chip control module 111 therein.

The secure chip control module 110 has an API 112. The secure chip control module 110 is adapted to receive information transmitted from the secure chip 114. The secure chip control modules 110, 111 are connected to the display unit 122. In addition, the secure chip 114 is connected to the display unit 122. The secure chip control modules 110, 111 and the secure chip 114 may be connected to different display units.

The secure chip 114 has an access control unit 116, a command execution unit 118, and a nonvolatile memory 120. The access control unit 116 is adapted to receive the chip access ticket from the application having the chip access ticket for access to the secure chip 114. On the other hand, the access control unit 116 is adapted to authenticate the chip access ticket received from the application. In addition, when the chip access ticket is legal, the access control unit 116 is adapted to permit the application to execute a command based on information about commands which the application is permitted to execute and based on information about memory regions of the IC chip which the application is permitted to access. The information about the commands and the information about the memory regions are included in the chip access ticket. When the chip access ticket is not legal, the access control unit 116 is adapted to transmit, to the outside, information about a reason why the chip access ticket is determined not to be legal. Further, the access control unit 116 is adapted to store the contents of the chip access ticket, e.g., temporary storage memory function, and is adapted to erase the stored contents of the chip access ticket. When the command issued by the application is executable, the command execution unit 118 is adapted to execute the command. It should be noted that, the secure chip 114 is an IC chip having excellent tamper resistant properties.

For example, when the secure chip control module 110 receives a chip access ticket 104 from the application 102 and accepts a request for start of use of the secure chip 114, the secure chip control module 110 turns on the secure chip 114. Then, the secure chip control module 110 issues a ticket authentication command to the access control unit 116 of the secure chip 114, and transmits the chip access ticket 104 to the access control unit 116 of the secure chip 114. The access control unit 116 permits execution of the ticket authentication command, and issues the ticket authentication command to the command execution unit 118.

The command execution unit 118 executes the ticket authentication command issued by the access control unit 116. When the command execution unit 118 executes the ticket authentication command, the access control unit 116 authenticates the chip access ticket 104 received from the secure chip control module 110.

When the access control unit 116 determines that the chip access ticket 104 is legal, the secure chip 114 notifies the secure chip control module 110 that the secure chip 114 has accepted the chip access ticket 104. Then, the secure chip control module 110 notifies the application 102 that the chip access ticket 104 has been authenticated.

After the application 102 is notified of the completion of the authentication of the chip access ticket 104, the application 102 calls the API 112 of the secure chip control module 110, and requests the secure chip control module 110 to execute the command.

When the secure chip control module 110 accepts the request for execution of the command from the application 102, the secure chip control module 110 issues the command to the access control unit 116 of the secure chip 114.

The access control unit 116 checks whether command issued by the secure chip control module 110 is a command permitted to be executed upon the authentication of the chip access ticket 104, and checks whether the access region of the command issued by the secure chip control module 110 is a region permitted to be accessed upon the authentication of the chip access ticket 104. After the access control unit 116 determines that the command issued by the secure chip control module 110 is a command permitted to be executed, and determines that the access region of the command is a region permitted to be accessed, the access control unit 116 permits execution of the command, and issues the command to the command execution unit 118. The command execution unit 118 executes the command issued by the access control unit 116.

When the access control unit 116 determines that the chip access ticket 104 is legal, the nonvolatile memory 120 stores the contents of the chip access ticket 104 to the memory region. When the secure chip 114 is turned off, the nonvolatile memory 120 erases the contents of the chip access ticket 104 stored in the memory region.

[4. Configuration of Chip Access Ticket]

Figure 4:
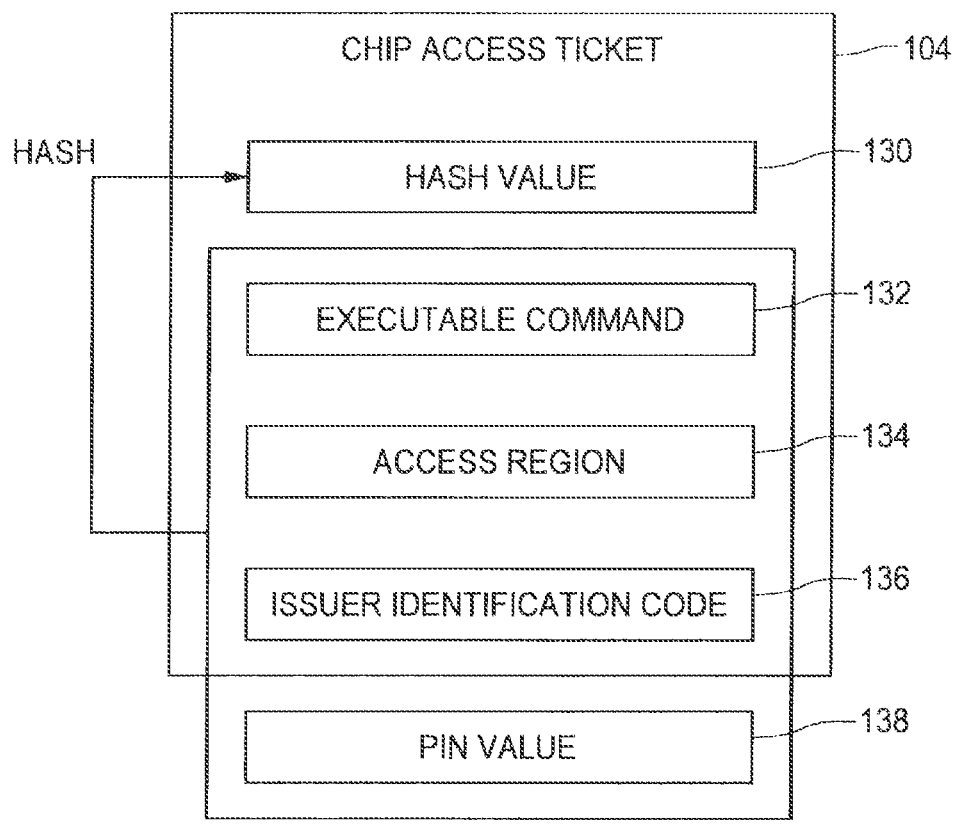
FIG. 4 is an explanatory diagram for illustrating an example schematic configuration of an example chip access ticket.

Subsequently, an example chip access ticket will be described. FIG. 4 is an explanatory diagram for illustrating an example schematic configuration of the example chip access ticket. FIG. 5 is an explanatory diagram for illustrating the configuration of the example chip access ticket in detail.

In FIGS. 4 and 5, the chip access ticket 104 includes a hash value 130, an executable command 132, an access region 134, and an issuer identification code 136. The PIN value 138 is set for each access region 134, and the information of the PIN value 138 may be generated by, for example, the secure chip issuer's PC 400, and may be generated by the application generator's PC 300.

The executable command 132 is information about a list of commands of the secure chip 114 executed by the application 102. The access region 134 is information about regions in the nonvolatile memory 120 of the secure chip 114 used by the application 102. The issuer identification code 136 is information for identifying the issuer of the secure chip 114. The hash value 130 is a hash value generated based on the executable command 132, the access region 134, the issuer identification code 136, and the PIN value 138.

[5. First Preparation Processing for Access Control]

The first preparation processing for access control of the client 100 that is executed by the information processing system 1000 of FIG. 2 will be hereinafter described. FIG. 6 is an example sequence diagram of the first preparation processing for access control of the client 100 that is executed by the information processing system 1000 of FIG. 2.

Figure 6:
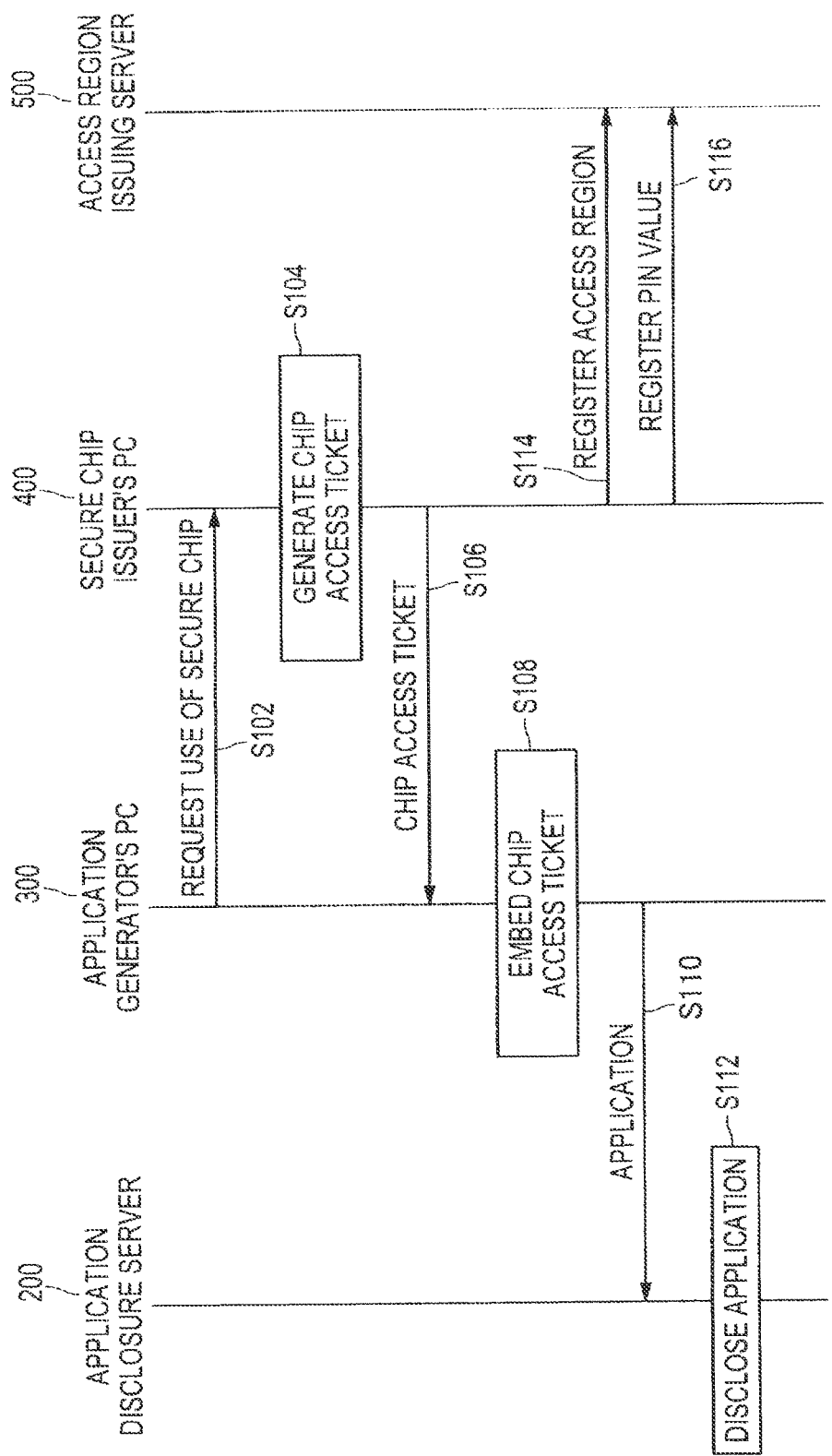
FIG. 6 is an example sequence diagram of a first preparation processing for access control of the client 100 that is executed by an information processing system 1000 of FIG. 2.

In FIG. 6, first, the application generator's PC 300 issues a request for using the secure chip 114 to the secure chip issuer's PC 400 so that the generated application 102 can use the secure chip 114 of the client 100 (step S102). For example, the application generator's PC 300 reports to the secure chip issuer's PC 400 a desired list of commands of the secure chip 114 which the generated application 102 executes and a desired list of regions in the nonvolatile memory 120 of the secure chip 114 which the generated application 102 uses, i.e., accesses.

Subsequently, the secure chip issuer's PC 400 having received the request for use of the secure chip 114 generates a chip access ticket as shown in FIGS. 4 and 5 based on the contents of the request of use (step S104). Then, the secure chip issuer's PC 400 issues the generated chip access ticket to the application generator's PC 300 (step S106).

Subsequently, the application generator's PC 300 embeds the chip access ticket issued in step S106 into the generated application 102 (step S108).

Subsequently, the application generator's PC 300 transmits the application 102 having the chip access ticket embedded therein to the application disclosure server 200 (step S110). Then, the application disclosure server 200 discloses the application 102 having the chip access ticket embedded therein (step S112). As a result, the client 100 can download the application 102 from the application disclosure server 200.

After the secure chip issuer's PC 400 performs the processing of step S104, the secure chip issuer's PC 400 registers information about the access region of the generated chip access ticket to the access region issuing server 500 (step S114), and registers information about the configured PIN value to the access region issuing server 500 for each access region of the generated chip access ticket (step S116).

[6. Second Preparation Processing for Access Control]

The second preparation processing for access control of the client 100 that is executed by the access region issuing server 500 and the client 100 in the information processing system 1000 of FIG. 2 will be hereinafter described. FIG. 7 is an example sequence diagram of the second preparation processing for access control of the client 100 that is executed by the access region issuing server 500 and the client 100 in the information processing system 1000 of FIG. 2. After the first preparation processing for access control of the client 100 shown in FIG. 6 is executed, the client 100 downloads the application 102, and the application 102 is installed and executed on the client 100. Thus, this processing is executed.

Figure 7:
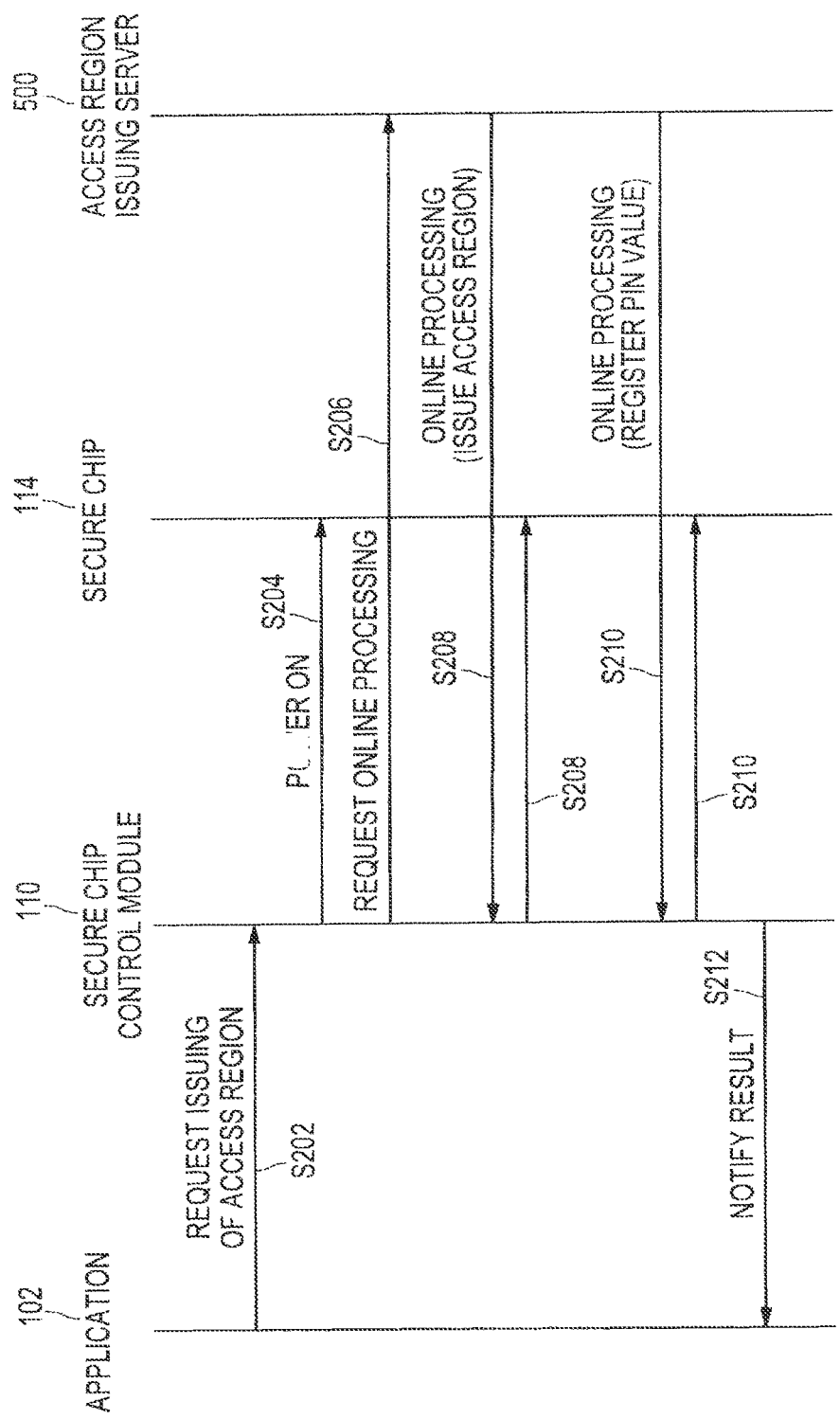
FIG. 7 is an example sequence diagram of a second preparation processing for access control of the client 100 that is executed by an example access region issuing server 500 and the example client 100 in the information processing system 1000 of FIG. 2.

In FIG. 7, when the application 102 starts in the client 100, the application 102 requests the secure chip control module 110 to issue an access region in the nonvolatile memory 120 of the secure chip 114 (step S202).

Subsequently, the secure chip control module 110 turns on the secure chip 114 (step S204), and requests the access region issuing server 500 to perform online processing in order to issue an access region in the nonvolatile memory 120 of the secure chip 114 and register a PIN value for each access region (step S206).

Subsequently, the access region issuing server 500 having accepted the online processing request issues the access region used by the application 102 in the nonvolatile memory 120 of the secure chip 114 by way of the secure chip control module 110 through online processing (step S208). Further, the access region issuing server 500 registers a PIN value for each issued access region in the nonvolatile memory 120 of the secure chip 114 by way of the secure chip control module 110 through online processing (step S210).

Subsequently, the secure chip control module 110 notifies the result of the online processing to the application 102 (step S212).

[7. Access Control Processing]

Figure 8:
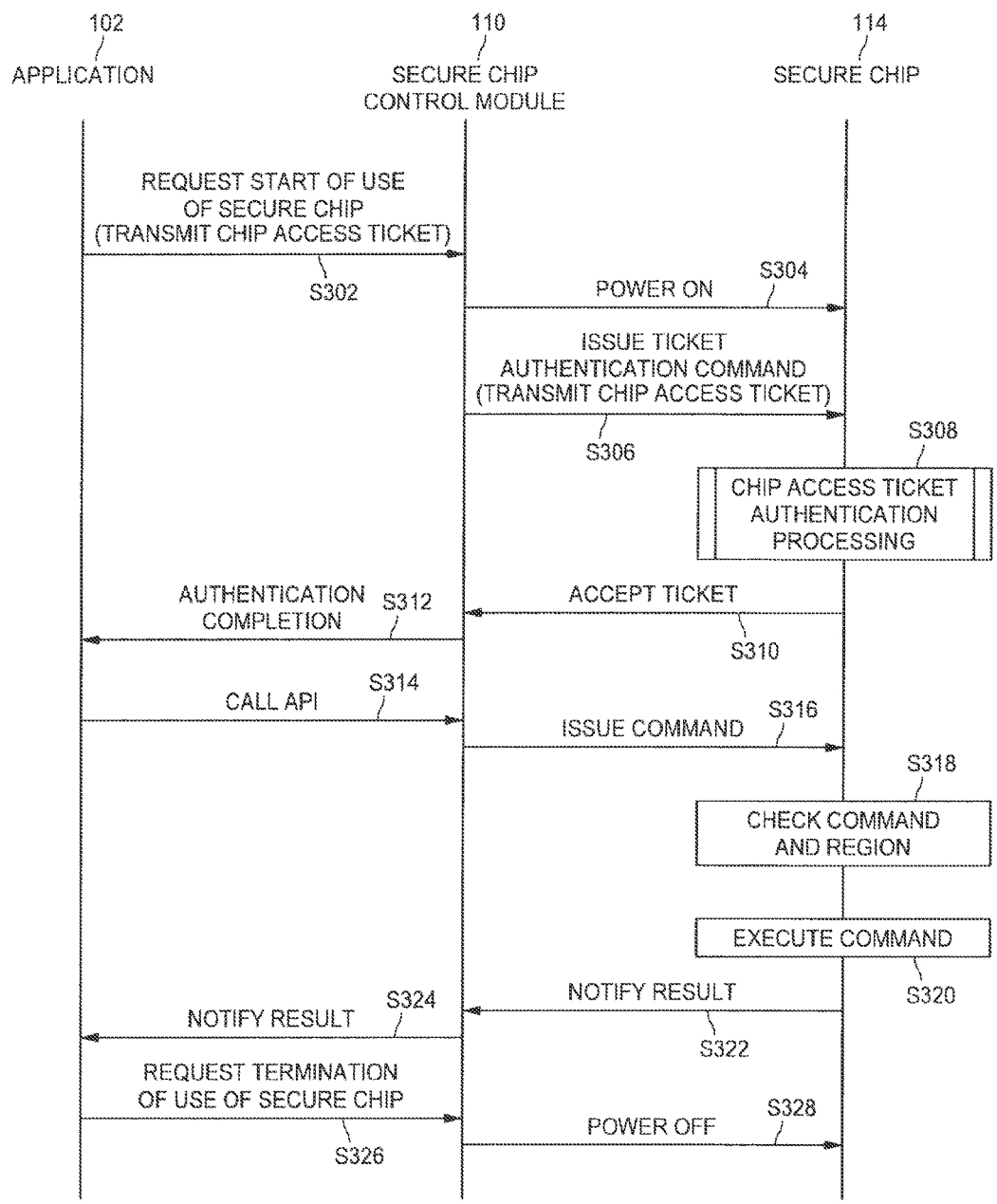
FIG. 8 is an example sequence diagram illustrating an access control processing executed by the client 100 of FIG. 3.

The example access control processing executed by the client 100 shown in FIG. 3 will be hereinafter described. FIG. 8 is an example sequence diagram illustrating the access control processing executed by the client 100 of FIG. 3. This processing is executed after the second preparation processing for access control of the client 100 of FIG. 7.

In FIG. 8, at first, the application 102 transmits the chip access ticket 104 to the secure chip control module 110, and requests start of use of the secure chip 114 (step S302).

Subsequently, the secure chip control module 110 turns on the secure chip 114 (step S304), issues a ticket authentication command to the secure chip 114, and transmits the chip access ticket 104 (step S306).

Subsequently, the secure chip 114 executes a later-described chip access ticket authentication processing shown in FIG. 9, and performs authentication to determine whether the received chip access ticket 104 is legal or not (step S308).

Subsequently, when the chip access ticket 104 is determined to be legal in step S308, the secure chip 114 stores the contents of the chip access ticket 104, and notifies the secure chip control module 110 that the chip access ticket 104 has been accepted (step S310). Then, the secure chip control module 110 notifies the application 102 that the chip access ticket 104 has been authenticated (step S312).

Subsequently, the application 102 calls a chip operation API for using the secure chip 114 (step S314). Then, when the application 102 requests the secure chip control module 110 to execute the command of the secure chip 114, the secure chip control module 110 issues a command to the secure chip 114 (step S316).

Subsequently, the secure chip 114 causes the access control unit 116 to check whether the command issued by the secure chip control module 110 is a command permitted to be executed upon the authentication of the chip access ticket 104 in step S308, and also checks whether the access region of the command issued by the secure chip control module 110 is a region permitted to be accessed upon the authentication of the chip access ticket 104 in step S308 (step S318).

Subsequently, in step S318, the secure chip 114 determines that the command is permitted to be executed, and that the access region of the command is permitted to be accessed. Thereafter, the command execution unit 118 executes the command (step S320).

Subsequently, the secure chip 114 notifies the secure chip control module 110 of the result of execution of the command (step S322). Then, the secure chip control module 110 notifies the application 102 of the result of execution of the command notified in step S322 (step S324).

Subsequently, the application 102 requests the secure chip control module 110 to terminate the use of the secure chip 114 (step S326).

Subsequently, the secure chip control module 110 turns off the secure chip 114 (step S328). When the secure chip 114 is turned off, the contents of the chip access ticket 104 stored in step S310 are erased. Alternatively, the secure chip control module 110 may separately issue a command for erasing the contents of the chip access ticket 104 stored in step S310 to the secure chip 114.

[8. Chip Access Ticket Authentication Processing]

Figure 9:
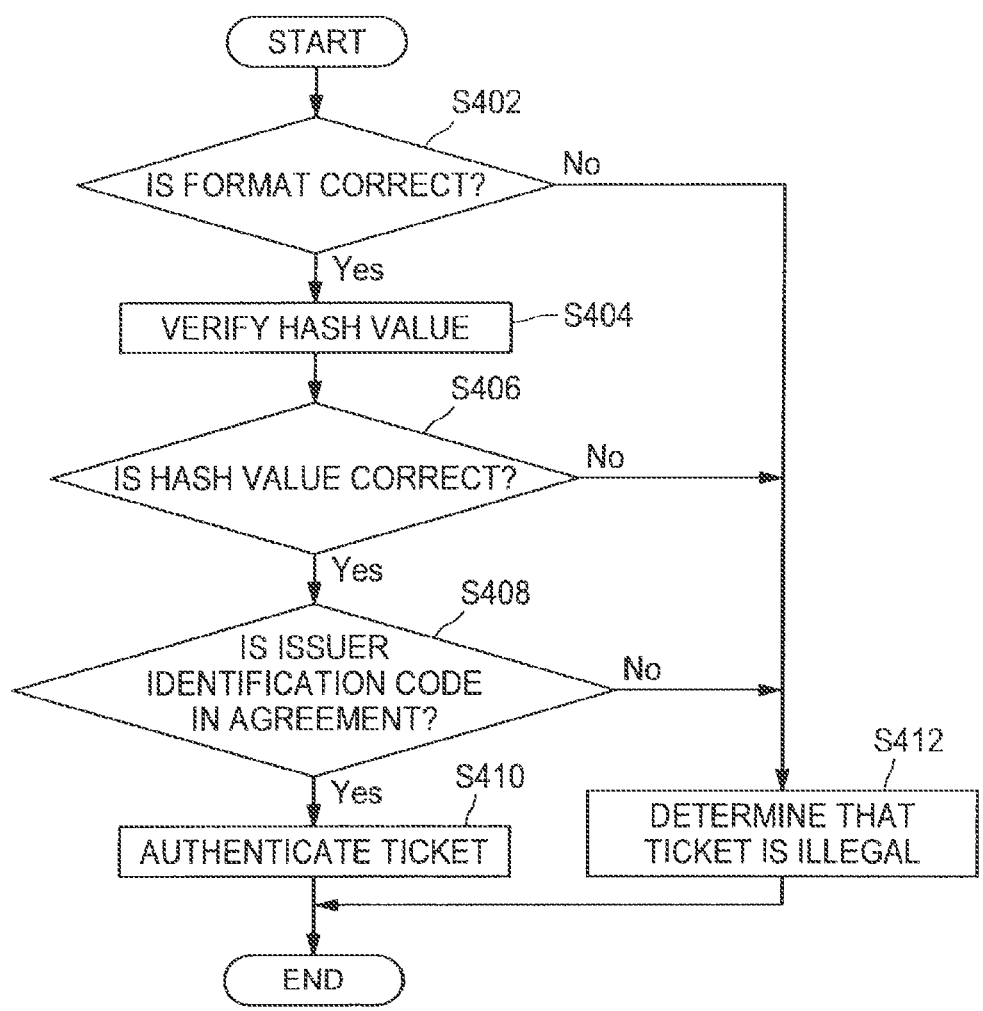
FIG. 9 is a flowchart illustrating an example chip access ticket authentication processing executed in step S308 of FIG. 8.

FIG. 9 is a flowchart illustrating the chip access ticket authentication processing executed in step S308 of FIG. 8.

In FIG. 9, at first, the access control unit 116 of the secure chip 114 determines whether the format of the chip access ticket 104 received from the secure chip control module 110 is correct or not (step S402). For example, the access control unit 116 of the secure chip 114 determines whether the format of the chip access ticket 104 is a format as shown in FIG. 4 that is defined in the generation of the chip access ticket 104 generated by the secure chip issuer's PC 400 in step S104 of FIG. 6.

When the format of the chip access ticket 104 is determined to be correct as a result of the determination made in step S402 (YES in step S402), the access control unit 116 of the secure chip 114 verifies the hash value 130 of the chip access ticket 104 (step S404). For example, the access control unit 116 of the secure chip 114 performs the verification by comparing the hash value 130 of the chip access ticket 104 with a hash value generated based on the executable command 132, the access region 134, and the issuer identification code 136 in the received chip access ticket 104 and based on the PIN value registered in the access region corresponding to the access region 134 in the nonvolatile memory 120. Alternatively, the access control unit 116 of the secure chip 114 may perform the verification by comparing the hash value 130 of the chip access ticket 104 with a hash value generated based on the executable command 132 and the access region 134 in the received chip access ticket 104, based on the issuer identification code registered in the secure chip 114, and based on the PIN value registered in the access region corresponding to the access region 134 in the nonvolatile memory 120.

Subsequently, the access control unit 116 of the secure chip 114 determines whether the hash value 130 of the chip access ticket 104 is correct or not based on the result of the verification in step S404 (step S406).

When the hash value 130 of the chip access ticket 104 is determined to be correct as a result of the determination in step S406 (YES in step S406), the access control unit 116 of the secure chip 114 determines whether the issuer identification code 136 of the chip access ticket 104 agrees with the issuer identification code of the secure chip 114 (step S408).

When the issuer identification code 136 of the chip access ticket 104 is determined to agree with the issuer identification code of the secure chip 114 as a result of the determination in step S408 (YES in step S408), the access control unit 116 of the secure chip 114 authenticates the chip access ticket 104 as a legal chip access ticket (step S410). Thus, the command of the executable command 132 of the chip access ticket 104 is permitted to be executed by the application 102, and the use of the access region corresponding to the access region 134 is permitted.

The access control unit 116 of the secure chip 114 determines that the chip access ticket 104 is an illegal chip access ticket (step S412) in the following cases: the format of the chip access ticket 104 is determined to be incorrect as a result of the determination in step S402 (NO in step S402); the hash value 130 of the chip access ticket 104 is determined to be incorrect as a result of the determination in step S406 (NO in step S406); or the issuer identification code 136 of the chip access ticket 104 is determined not to agree with the issuer identification code of the secure chip 114 as a result of the determination in step S408 (NO in step S408).

According to the access control processing of FIG. 8, the chip access ticket transmitted from the application is authenticated, and when the chip access ticket is determined to be legal, the execution of the command given by the application is permitted based on information about commands which the application is permitted to execute and based on information about memory regions of the secure chip which the application is permitted to access. The information about the commands and the information about the memory regions are included in the chip access ticket. Therefore, the application can be reliably prevented from making an illegal access to the secure chip 114.

In a case where the secure chip issuer sets a special access region in the access region 134 for an application that manages the secure chip 134, the secure chip 114 may permit the use of all the access regions at a time, and may be adapted to give permission for commands only.

In a case where the secure chip issuer sets a special access region in the access region 134 that is set for an application that uses only the function of the secure chip 114 that does not rely on the access region (for example, radio communication function with an external information terminal included in the secure chip 114), the secure chip 114 may prohibit the use of all the access regions, and may be adapted to give permission for commands only.

When the access region 134 is not specified in the chip access ticket, the secure chip 114 may determine that the secure chip issuer has made the setting for the application that manages the secure chip 134 or determines that the secure chip issuer has made the setting for the application that uses the function of the secure chip 114 that does not reply on the access region, and the secure chip 114 may be adapted to automatically perform authentication with the PIN value of the special access region.

[9. Details of Access Control Processing]

Figure 10:
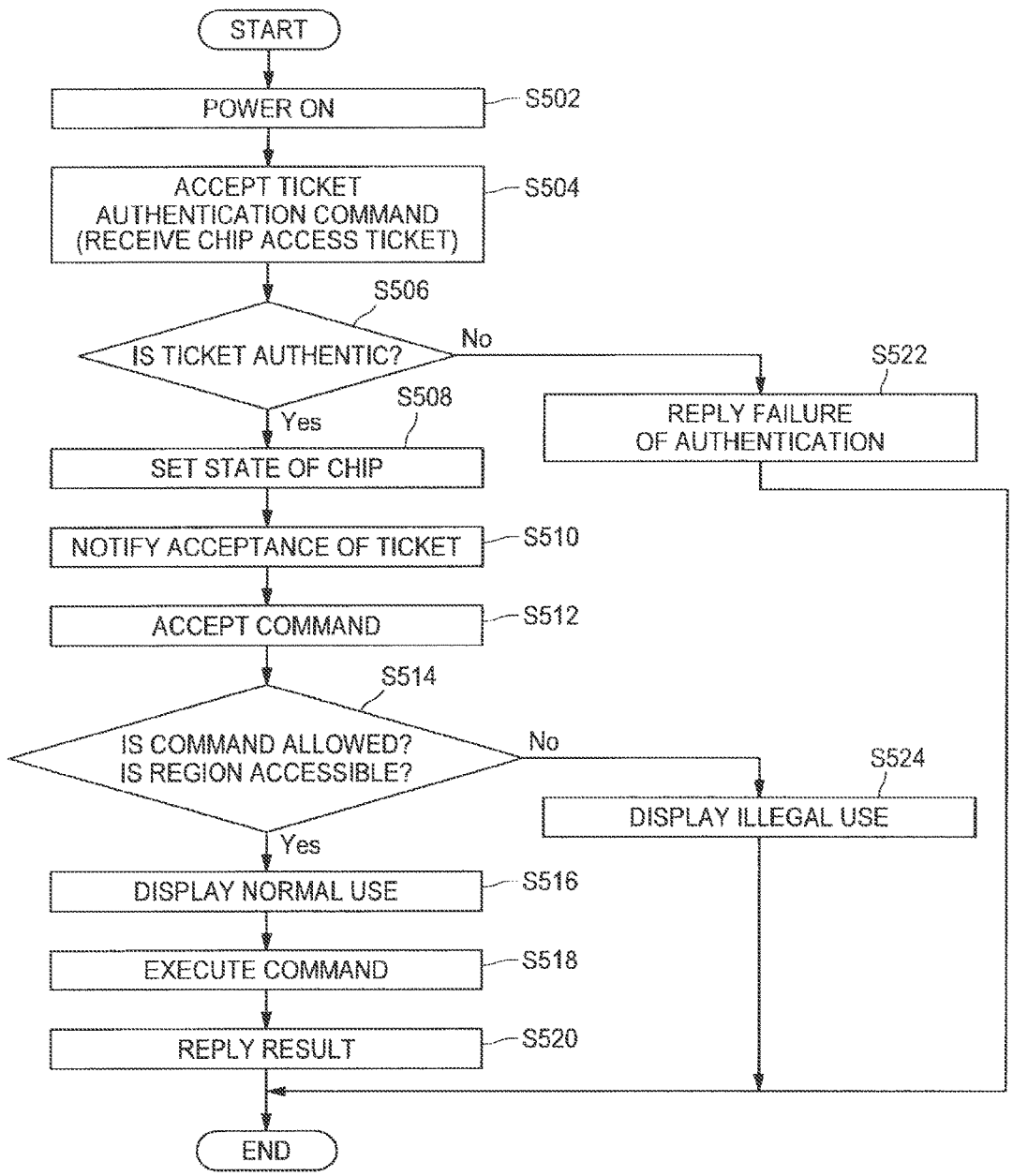
FIG. 10 is a flowchart illustrating the details of the access control processing of FIG. 8.

Subsequently, the details of the access control processing of FIG. 8 will be described. FIG. 10 is a flowchart illustrating the details of the access control processing of FIG. 8.

In FIG. 10, at first, the secure chip 114 is turned on by the secure chip control module 110 (step S502). The secure chip 114 accepts the ticket authentication command issued by the secure chip control module 110, and receives the chip access ticket 104 (step S504).

Subsequently, the access control unit 116 of the secure chip 114 determines whether the received chip access ticket 104 is a legal chip access ticket (step S506).

When the received chip access ticket 104 is determined to be a legal chip access ticket as a result of the determination in step S506 (YES in step S506), the access control unit 116 of the secure chip 114 sets the state of the secure chip 114 so as to enable the command of the executable command 132 of the chip access ticket 104 and to enable the use of the access region corresponding to the access region 134 (step S508), and notifies the secure chip control module 110 that the chip access ticket 104 has been accepted (step S510).

Subsequently, the secure chip 114 accepts the command given by the secure chip control module 110 that has accepted the request for execution of the command of the secure chip 114 from the application 102 (step S512).

Subsequently, the access control unit 116 of the secure chip 114 determines whether the command issued by the secure chip control module 110 is a command permitted to be executed upon the authentication of the chip access ticket 104 and determines that the access region of the command issued by the secure chip control module 110 is a region permitted to be accessed upon the authentication of the chip access ticket 104 (step S514).

When the command issued by the secure chip control module 110 is determined to be a command permitted to be executed and the access region of the command is determined to be a region permitted to be accessed as a result of the determination in step S514 (YES in step S514), the access control unit 116 of the secure chip 114 permits the execution of the command, and uses the display unit 122 to display normal use of the secure chip 114 to the user. For example, the access control unit 116 of the secure chip 114 may display normal use by lighting an LED of the display unit 122, and may change the color and the type of LED lighted according to the command.

Subsequently, the command execution unit 118 of the secure chip 114 executes the command of which execution is permitted by the access control unit 116 of the secure chip 114 (step S518). Then, the secure chip 114 replies the result of the execution of the command to the secure chip control module 110 (step S520).

When the received chip access ticket 104 is determined not to be a legal chip access ticket as a result of the determination in step S506 (NO in step S506), the secure chip 114 replies information indicating the failure of the authentication of the chip access ticket 104 to the secure chip control module 110 (step S522).

When, as a result of the determination in step S514, the command issued by the secure chip control module 110 is determined not to be a command permitted to be executed, or the access region of the command is determined not to be a region permitted to be accessed (NO in step S514), the access control unit 116 of the secure chip 114 prohibits the execution of the command, and uses the display unit 122 to display illegal use of the secure chip 114 to the user (step S524). For example, the access control unit 116 of the secure chip 114 may display illegal use by lighting an LED of the display unit 122, and may change the color and the type of LED lighted according to the command.

[10. PIN Value Change Processing]

Figure 11:
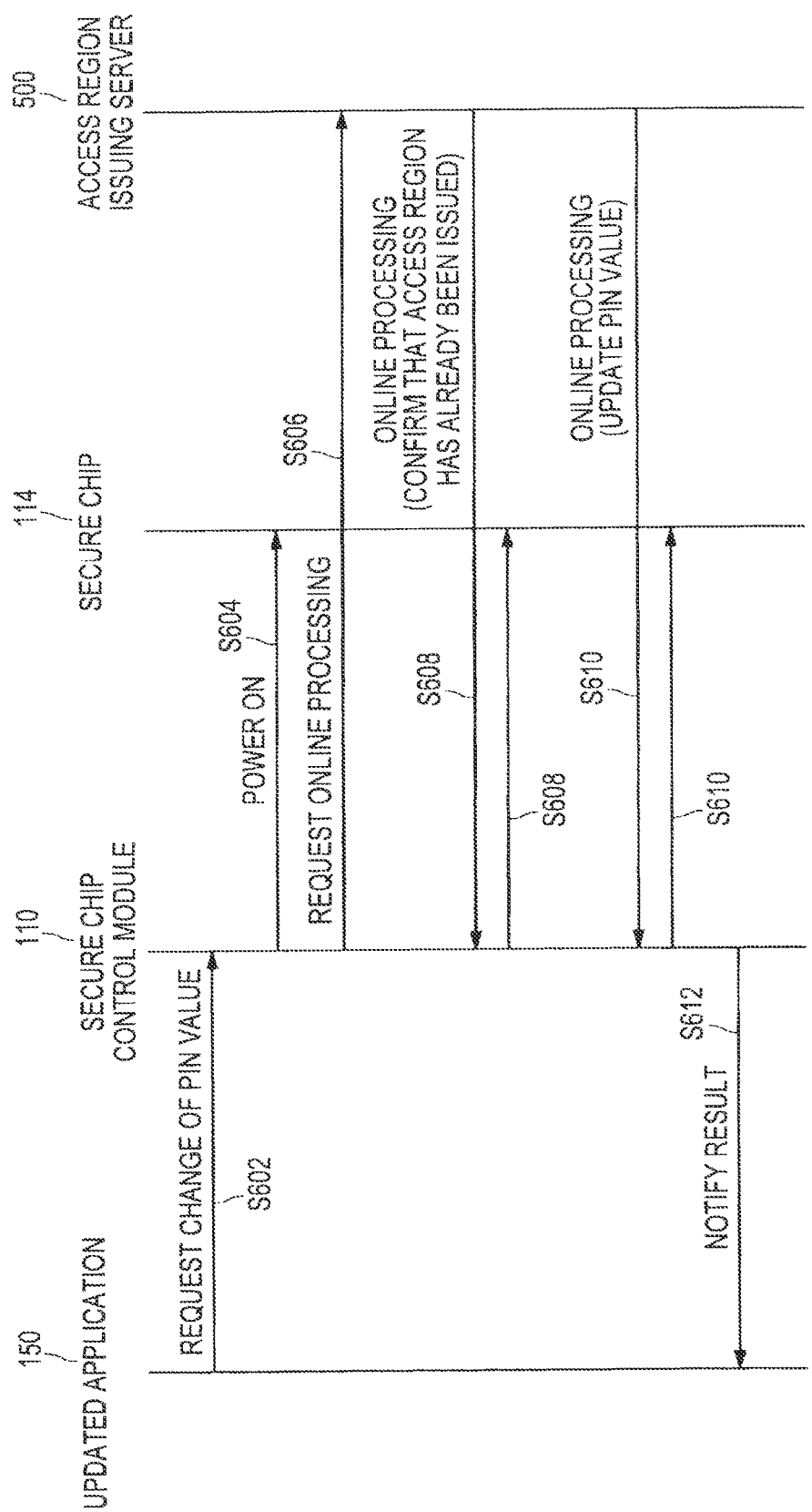
FIG. 11 is an example sequence diagram illustrating a PIN value change processing executed by the access region issuing server 500 and the client 100 in the information processing system 1000 of FIG. 2.

A PIN value change processing executed by the access region issuing server 500 and the client 100 in the information processing system 1000 of FIG. 2 will be hereinafter described. FIG. 11 is a sequence diagram illustrating the PIN value change processing executed by the access region issuing server 500 and the client 100 in the information processing system 1000 of FIG. 2. This processing is executed in order to prevent illegal access to the secure chip 114 by making use of the compromised or stolen PIN value 138 when the PIN value 138 is compromised or stolen. This processing is executed after the following steps are performed: the client 100 downloads an updated application 150; and thereafter the updated application 102 is installed on the client 100.

In FIG. 11, at first when the updated application 150 is activated in the client 100, the updated application 150 requests the secure chip control module 110 to change the PIN value registered for each access region in the nonvolatile memory 120 of the secure chip 114 (step S602).

Subsequently, the secure chip control module 110 turns on the secure chip 114 (step S604), and requests the access region issuing server 500 to perform online processing for updating the PIN value registered for each access region in the nonvolatile memory 120 of the secure chip 114 (step S606).

Subsequently, the access region issuing server 500 having accepted the online processing request confirms whether the access region used by the application 102 has already been issued in the nonvolatile memory 120 of the secure chip 114 through online processing by way of the secure chip control module 110 (step S608). Further, the access region issuing server 500 updates the PIN value registered for each access region in the nonvolatile memory 120 of the secure chip 114 through online processing by way of the secure chip control module 110 (step S610).

Subsequently, the secure chip control module 110 notifies the application 102 of the result of the online processing (step S612).

According to the PIN value change processing of FIG. 11, when the PIN value 138 is compromised or stolen, the PIN value 138 can be changed. Therefore, the PIN value change processing prevents illegal access to the secure chip 114 that is made by making use of the PIN value 138.

[11. Modification of Chip Access Ticket Authentication Processing]

Figure 12:
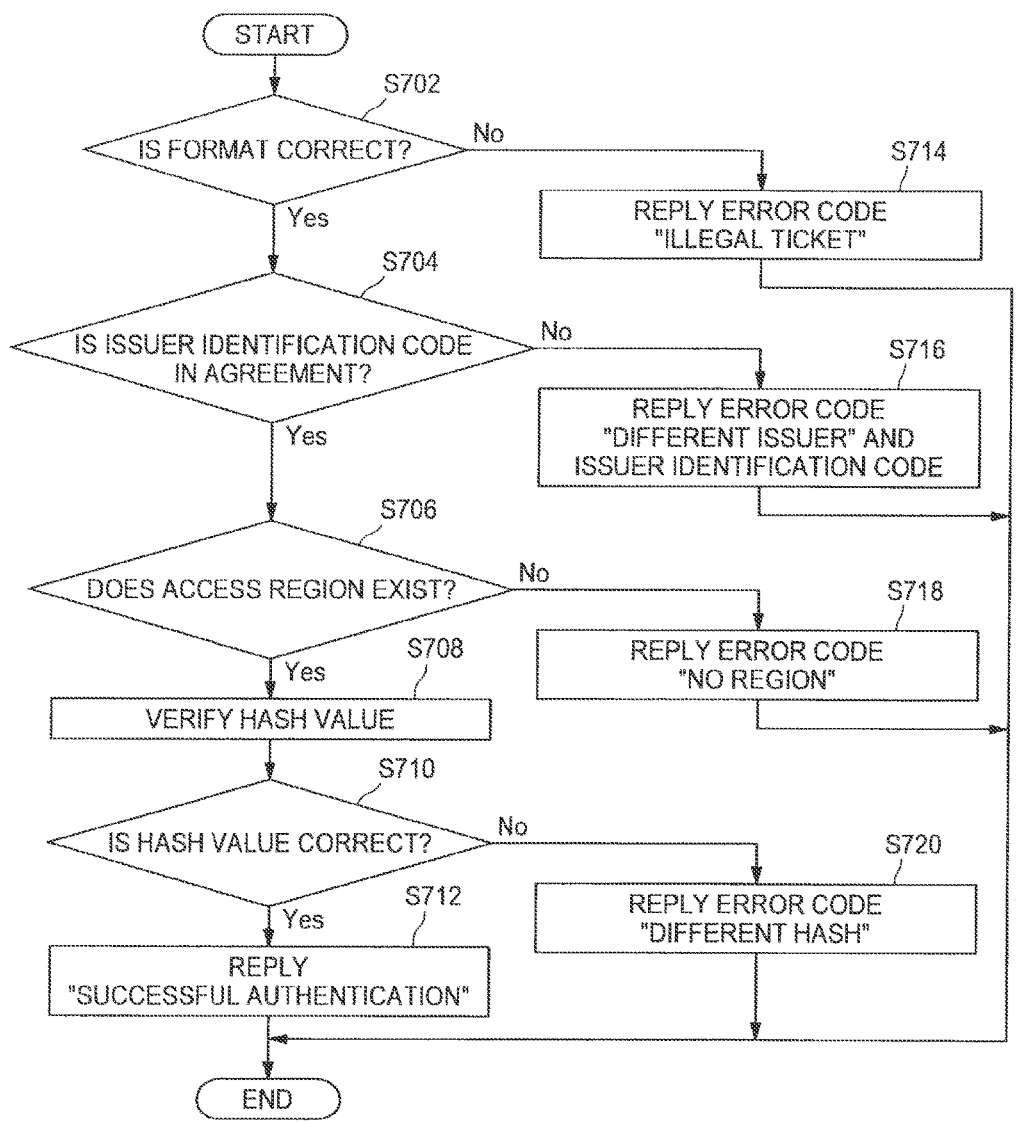
FIG. 12 is a flowchart illustrating an example modification of the chip access ticket authentication processing executed in step S308 of FIG. 8.

A modification of the chip access ticket authentication processing executed in step S308 of FIG. 8 will be hereinafter described. FIG. 12 is a flowchart illustrating an example modification of the chip access ticket authentication processing executed in step S308 of FIG. 8.

In FIG. 12, the secure chip 114 determines whether the format of the chip access ticket 104 received from the secure chip control module 110 is correct or not (step S702).

When the format of the chip access ticket 104 is determined to be correct as a result of the determination in step S702 (YES in step S702), the secure chip 114 determines whether the issuer identification code 136 of the chip access ticket 104 agrees with the issuer identification code of the secure chip 114 (step S704).

When the issuer identification code 136 of the chip access ticket 104 is determined to agree with the issuer identification code of the secure chip 114 as a result of the determination in step S704 (YES in step S704), the secure chip 114 determines whether the access region 134 of the chip access ticket 104 exists in the nonvolatile memory 120 or not (step S706).

When the access region 134 of the chip access ticket 104 is determined to exist in the nonvolatile memory 120 as a result of the determination in step S706 (YES in step S706), the secure chip 114 verifies the hash value 130 of the chip access ticket 104 (step S708).

Subsequently, the secure chip 114 determines whether the hash value 130 of the chip access ticket 104 is correct or not as a result of the verification in step S708 (step S710).

When the hash value 130 of the chip access ticket 104 is determined to be correct as a result of the determination in step S710 (YES in step S710), the secure chip 114 authenticates the chip access ticket 104 as a legal chip access ticket, and replies information indicating "successfully authenticated" to the secure chip control module 110 (step S712).

When the format of the chip access ticket 104 is determined not to be correct as a result of the determination in step S702 (NO in step S702), the secure chip 114 replies an error code indicating "illegal ticket" to the secure chip control module 110 (step S714).

When the issuer identification code 136 of the chip access ticket 104 is determined not to agree with the issuer identification code of the secure chip 114 as a result of the determination in step S704 (NO in step S704), the secure chip 114 replies an error code indicating "wrong issuer" and the issuer identification code of the secure chip 114 to the secure chip control module 110 (step S716). Alternatively, in step S714, only the error code indicating "wrong issuer" may be transmitted to the secure chip control module 110.

When the access region 134 of the chip access ticket 104 is determined to exist in the nonvolatile memory 120 as a result of the determination in step S706 (NO in step S706), the secure chip 114 replies an error code indicating "no region" to the secure chip control module 110 (step S718).

When the hash value 130 of the chip access ticket 104 is determined not to be correct as a result of the determination in step S710 (No in step S710), the secure chip 114 replies an error code indicating "wrong hash" to the secure chip control module 110 (step S720).

According to the chip access ticket authentication processing of FIG. 12, when the authentication of the chip access ticket 104 in the secure chip 114 fails, the secure chip 114 replies an error code to the secure chip control module 110. Then, the secure chip control module 110 executes processing according to the received error code as follows.

[12. Processing According to Error Code]

The processing executed by the client 100 of FIG. 3 according to the error code will be hereinafter described. FIG. 13 is a flowchart illustrating example processing performed according to the error code that is executed by the client 100 of FIG. 3. This processing is executed after the secure chip 114 replies an error code to the secure chip control module 110 in the chip access ticket authentication processing of FIG. 12.

In FIG. 13, at first, the secure chip control module 110 of the client 100 determines whether the error code received from the secure chip 114 is an error code indicating "illegal ticket" or not (step S802).

When the error code is determined to be an error code indicating "illegal ticket" as a result of the determination in step S802 (YES in step S802), the secure chip control module 110 uses the display unit 122 to warn the user that the illegal application is running to operate the secure chip 114 (step S804). In step S804, the operation of the illegal application that has sent the chip access ticket 104 may be forcibly halted, and the illegal application may be forcibly deleted. Accordingly, illegal access to the secure chip 114 can be prevented in advance.

When the error code is determined not to be an error code indicating "illegal ticket" as a result of the determination in step S802 (NO in step S802), the secure chip control module 110 determines whether the error code is an error code indicating "wrong issuer" or not (step S806).

When the error code is determined to be an error code indicating "wrong issuer" as a result of the determination in step S806 (YES in step S806), the secure chip control module 110 uses the display unit 122 to notify the user that the issuer of the application is different from the issuer of the secure chip 114 to be operated (step S808). In step S808, when the secure chip control module 110 receives the error code indicating "wrong issuer" as well as the issuer identification code of the secure chip 114, the secure chip control module 110 may search, based on the issuer identification code, a source from which the application providing the same service for the current issuer of the secure chip 114 can be downloaded, and may cause a browser to display the source to prompt the user to replace or update the application, or may automatically download the application to replace or update the application.

When the error code is determined not to be an error code indicating "wrong issuer" as a result of the determination in step S806 (NO in step S806), the secure chip control module 110 determines whether the error code is an error code indicating "no region" or not (step S810).

When the error code is determined to be an error code indicating "no region" as a result of the determination in step S810 (YES in step S810), the secure chip control module 110 uses the display unit 122 to notify the user that the region has not yet been issued in the secure chip 114 (step S812). In step S812, the secure chip control module 110 may exchange information with the application 102, and may issue the region by requesting access region issuing server 500 to perform online processing for issuing the access region.

When the error code is determined not to be an error code indicating "no region" as a result of the determination in step S810 (NO in step S810), the error code is an error code indicating "wrong hash". In this case, the chip access ticket 104 of the application 102 or the PIN value in the secure chip 114 may not be the latest. Accordingly, the secure chip control module 110 notifies the user that it may be necessary to update the application 102 or the PIN value (step S814). In step S814, the secure chip control module 110 may exchange information with the application 102, and checks whether a new version of the application has been released or not. When the new version of the application has been released, the secure chip control module 110 may download and update the application. The secure chip control module 110 may update the PIN value by requesting the access region issuing server 500 to perform online processing for changing the PIN value.

According to the processing performed in accordance with the error code shown in FIG. 13, the user can understand the reason why the chip access ticket is determined not to be legal. Thereafter, required processing can be automatically executed. Therefore, the usability for the user may be improved.

When the application is updated, the region is issued, or the PIN value is updated in the processing performed according to the error code shown in FIG. 13, the secure chip control module 110 may issue the ticket authentication command of the chip access ticket to the secure chip 114 again, and may cause the secure chip 114 to perform the chip access ticket authentication processing again. At this occasion, when the secure chip control module 110 receives the same error code as the previous one from the secure chip 114, the secure chip control module 110 uses the display unit 122 to notify the user of the occurrence of abnormality, and terminates the application.

Embodiments of the present disclosure can be achieved by supplying a storage medium storing program codes of the software for achieving the functions of each of the above-described example embodiments to a system or an apparatus and causing the computer (or CPU, MPU or the like) of the system or the apparatus to read and execute the program codes stored in the storage medium.

In this case, the program codes read from the storage medium achieve the functions of each of the above-described example embodiments.

Examples of the storage mediums for providing the program codes include a floppy (registered trademark) disk, a hard disk, a magneto-optical disk, an optical disc such as CD-ROM, CD-R, CD-RW, DVD-ROM, DVD-RAM, DVD-RW, and DVD+RW, a magnetic tape, a nonvolatile memory card, and a ROM. Alternatively, the program codes may be downloaded via a network.

Further, the functions of each of the above-described example embodiments may be accomplished not only by executing the program codes read out by the computer, but also by causing an OS (operating system) or the like which runs on the computer to perform a part or all of the actual processings based on instructions of the program codes.

Further, the functions of each of the above-described example embodiments may be accomplished by writing the program codes read out from the storage medium into a memory provided on a function expansion board inserted into a computer or in a function expansion unit connected to the computer and then causing a CPU or the like provided in the expansion board or the expansion unit to perform a part or all of the actual processings based on instructions of the program codes.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An integrated circuit chip comprising:
a processing circuitry configured to:
receive an authentication command;
execute the authentication command using authentication information and store an authentication result;
receive an executable command requested by an application;
execute the executable command based on the authentication result;
receive a request for updating security related information from the application;
request a server to perform online processing for updating the security related information;
receive an updated security related information from the server; and
receive a command that triggers an erasion of the stored authentication result.

2. The integrated circuit chip of claim 1, wherein the security related information includes a PIN value.

3. The integrated circuit chip of claim 1, wherein the integrated circuit chip further comprising an authentication control unit configured to authenticate a request using the authentication information.

4. The integrated circuit chip of claim 3, wherein the request includes at least one of the executable command, an access region, and an issuer identification code.

5. The integrated circuit chip of claim 4, wherein the processing circuitry is configured to execute the executable command based on:
(i) executable command information indicating executable commands which the application is permitted to execute; and
(ii) information about memory regions of the integrated circuit chip which the application is permitted to access.

6. The integrated circuit chip of claim 3, wherein at least one of the authentication command and the authentication information is issued to an application generator.

7. The integrated circuit chip of claim 6, wherein in response to receiving the authentication command, the processing circuitry is configured to access a memory location.

8. The integrated circuit chip of claim 3, wherein the authentication information includes a hash value.

9. The integrated circuit chip of claim 3, wherein the processing circuitry is configured to notify a chip control module of the authentication result.

10. The integrated circuit chip of claim 1, wherein the processing circuitry is configured to notify a result of the online processing to the application.

11. A method comprising:
receiving, by an integrated circuit chip, an authentication command;
executing the authentication command using authentication information and storing an authentication result;
receiving an executable command requested by an application;
executing, by the integrated circuit chip, the executable command based on the authentication result;
receiving a request for updating security related information from the application;
requesting a server to perform online processing for updating the security related information;
receiving an updated security related information from the server; and
receiving, by the integrated circuit chip, a command that triggers an erasion of the stored authentication result.

12. The method of claim 11, further comprising notifying a result of the online processing to the application.

13. An information processing apparatus comprising:
an integrated circuit chip including a processing circuitry, wherein the processing circuitry configured to:
receive an authentication command;
execute the authentication command using authentication information and store an authentication result;
receive an executable command requested by an application;
execute the executable command based on the authentication result;
receive a request for updating security related information from an application;
request a server to perform online processing for updating the security related information;
receive an updated security related information from the server; and
receive a command that triggers an erasion of the stored authentication result.

14. The information processing apparatus of claim 13, wherein the information processing apparatus includes a portable telephone.

15. A non-transitory storage medium storing a program which, when executed, causes an integrated circuit chip including a processing circuitry to:
- receive an authentication command;
- execute the authentication command using authentication information and store an authentication result;
- receive an executable command requested by an application;
- execute the executable command based on the authentication result;
- receive a request for updating security related information from an application;
- request a server to perform online processing for updating the security related information;
- receive an updated security related information from the server; and
- receive a command that triggers an erasure of the stored authentication result.

* * * * *